US009677644B2

(12) United States Patent
Karlsson et al.

(10) Patent No.: US 9,677,644 B2
(45) Date of Patent: Jun. 13, 2017

(54) ELECTRIC DRIVE DEVICE

(75) Inventors: Pontus Karlsson, Bromma (SE); Oskar Prinsback, Järved (SE)

(73) Assignee: BAE Systems Hägglunds Aktiebolag, Örnsköldsvik (SE)

( * ) Notice: Subject to any disclaimer, the term of this patent is extended or adjusted under 35 U.S.C. 154(b) by 0 days.

(21) Appl. No.: 13/885,335

(22) PCT Filed: Nov. 11, 2011

(86) PCT No.: PCT/SE2011/051354
§ 371 (c)(1),
(2), (4) Date: Aug. 6, 2013

(87) PCT Pub. No.: WO2012/067568
PCT Pub. Date: May 24, 2012

(65) Prior Publication Data
US 2014/0087905 A1    Mar. 27, 2014

(30) Foreign Application Priority Data

Nov. 15, 2010 (SE) ........................................ 1051196

(51) Int. Cl.
*F16H 1/28* (2006.01)
*B60K 1/00* (2006.01)
*H02K 7/116* (2006.01)

(52) U.S. Cl.
CPC ............... *F16H 1/28* (2013.01); *B60K 1/00* (2013.01); *H02K 7/116* (2013.01); *B60K 2001/001* (2013.01); *B60L 2220/50* (2013.01)

(58) Field of Classification Search
CPC ........................................... B60K 2007/0053
(Continued)

(56) References Cited

U.S. PATENT DOCUMENTS 1,264,748 A * 4/1918 Apple ............................ 180/62
1,348,539 A * 8/1920 Breitenbach .................. 310/115
(Continued)

FOREIGN PATENT DOCUMENTS

CN    1800623 A    7/2006
DE    10219921 A1   11/2003
(Continued)

OTHER PUBLICATIONS

Written Opinion received for Singapore Patent Application No. 201302727-1, mailed on Jun. 20, 2014, 4 pages.
Office Action received for Australian Patent Application No. 2011329559, issued on Jun. 23, 2014, 3 pages.
International Preliminary Report on Patentability received for PCT Patent Application No. PCT/SE2011/051354, mailed on May 30, 2013, 7 pages.
International Search Report and Written Opinion received for PCT Patent Application No. PCT/SE2011/051354, mailed on Feb. 21, 2012, 10 pages.
(Continued)

*Primary Examiner* — Derek D Knight
*Assistant Examiner* — Timothy M Hannon
(74) *Attorney, Agent, or Firm* — Morrison & Foerster LLP

(57) ABSTRACT

The present invention relates to an electric drive device comprising an electric motor (20) with a stator and a rotor arranged to rotate a drive shaft, wherein said electric motor (20) is arranged to be accommodated in a housing, further comprising opposite gear housings surrounding the electric motor, each containing a transmission configuration, wherein the electric drive device comprises a housing configuration in which the electric motor (20) as well said opposite gear housings (30*a*, 30*b*) are accommodated, wherein each gear housing (30*a*, 30*b*; 130*a*, 130*b*) is attached and hereby locked to said housing configuration. The invention also relates to a motor vehicle.

18 Claims, 6 Drawing Sheets

(58) Field of Classification Search
USPC ............... 475/149, 150, 151; 477/7, 8, 9
See application file for complete search history.

(56) References Cited

U.S. PATENT DOCUMENTS

| | | | |
|---|---|---|---|
| 2,295,076 A * | 9/1942 | Cochran ................. | 475/149 |
| 3,177,728 A * | 4/1965 | Farison .................. | 74/7 A |
| 6,398,685 B1 | 6/2002 | Wachauer et al. | |
| 7,549,939 B2 * | 6/2009 | Strauss et al. ........... | 475/5 |
| 2006/0244317 A1 * | 11/2006 | Kramer .................. | 310/20 |

FOREIGN PATENT DOCUMENTS

| | | |
|---|---|---|
| DE | 102004037266 A1 | 2/2006 |
| DE | 102009006424 A1 | 7/2010 |
| EP | 2147817 A1 * | 1/2010 |

OTHER PUBLICATIONS

Examination Report received for Australian Patent Application No. 2011329559, mailed on Jan. 5, 2015, 3 pages.
Office Action received for Chinese Patent Application No. 201180055038.3, mailed on Mar. 18, 2015, 13 pages (6 pages of English Translation and 7 pages of Official Copy).
Office Action Received for Chinese Patent Application No. 201180055038.3, mailed on Nov. 16, 2015, 14 pages (7 pages of English Translation and 7 pages of Official Copy).
Office Action received for Chinese Patent Application No. 201180055038.3, mailed on May 26, 2016, 11 pages (4 pages of English Translation and 7 pages of Official Copy).

\* cited by examiner

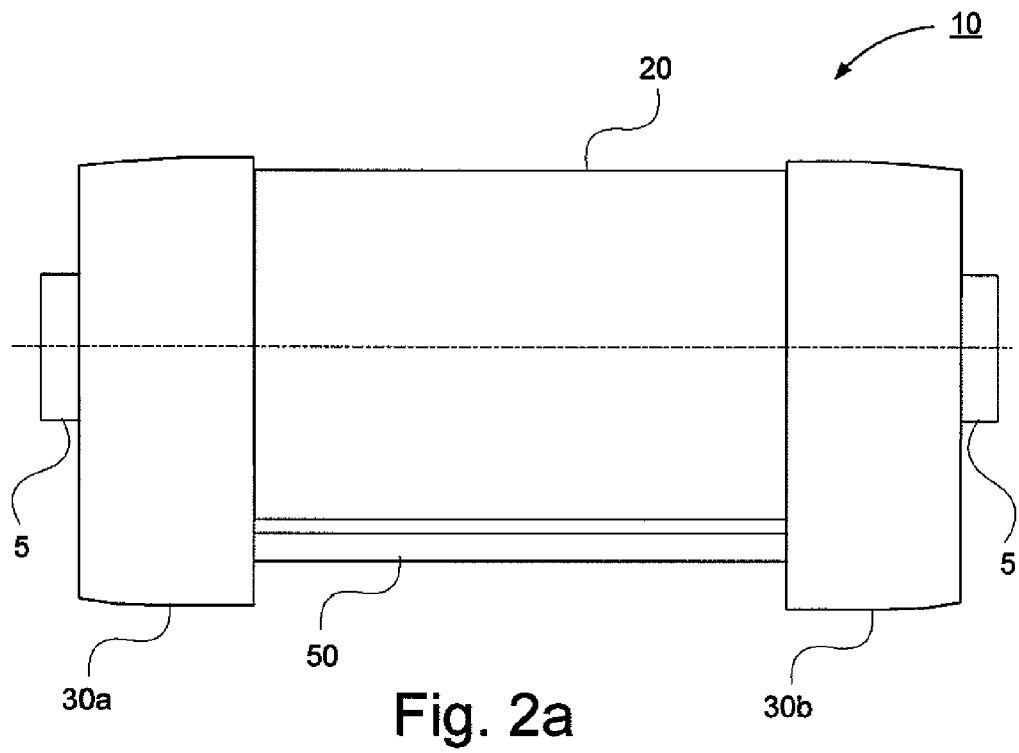
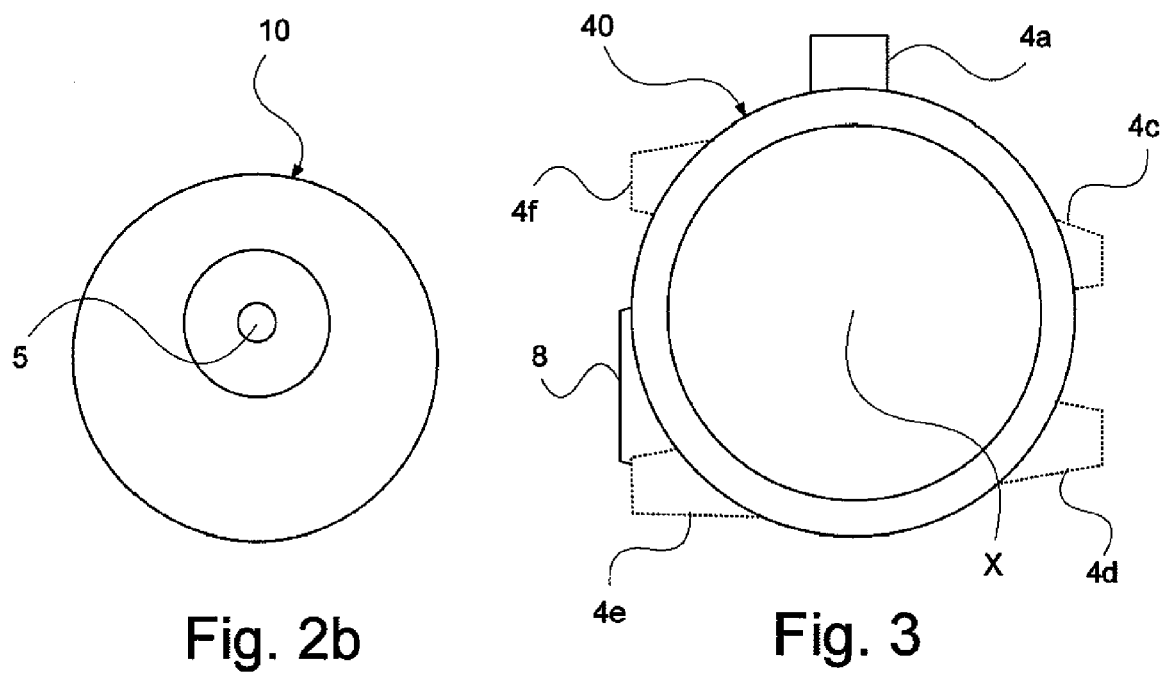

ELECTRIC DRIVE DEVICE

CROSS REFERENCE TO RELATED APPLICATIONS

This is a U.S. National Phase patent application of PCT/SE2011/051354, filed Nov. 11, 2011, which claims priority to Swedish Patent Application No. 1051196-2, filed Nov. 15, 2010, each of which is hereby incorporated by reference in the present disclosure in its entirety.

TECHNICAL FIELD

The invention relates to an electric drive device according to the preamble of claim 1. The invention also relates to a motor vehicle.

BACKGROUND ART

It is known to drive heavy motor vehicles with electric drive units comprising electric motor. In heavy motor vehicles heavy loads may result in loads being transferred to the electric motor damaging it, which may result in reduction of life of the electric motor. Further, heavy vehicles demands electric drive units with high efficiency which results in the electric drive unit being relatively heavy rendering assembling and disassembling more difficult.

OBJECTS OF THE INVENTION

An object of the present invention is to provide an electric drive device prolonging the life of the electric motor and facilitating assembly during arrangement of the same at the motor vehicle.

SUMMARY OF THE INVENTION

These and other objects, apparent from the following description, are achieved by an electric drive device and a motor vehicle, which are of the type stated by way of introduction and which in addition exhibits the features recited in the characterising clause of the appended claims 1 and 17.

Preferred embodiments of the electric drive device are defined in appended dependent claims 2-16.

Specifically an object of the invention is achieved by an electric drive device comprising an electric rotor with a stator and a rotor arranged to rotate a drive shaft, wherein said electric motor is arranged to be accommodated in a housing, further comprising opposite gear housings surrounding the electric motor, each containing a transmission configuration, characterised by a housing configuration in which the electric motor as well as said opposite gear housings are accommodated wherein each gear housing is attached and hereby locked to said housing configuration.

By locking each gear housing to said housing configuration a prolonged life of the electric motor is facilitated in that said locking facilitates outer loads only affecting the housing configuration which is permitted to be bent while the electric motor essentially is not affected wherein essentially no loads or only small loads are transmitted to the electric motor when arranged in a vehicle. Hereby is avoided that stator and rotor come into contact with each other which may lead to the electric motor becoming useless. Further, assembly and disassembly of the electric motor is hereby facilitated in that said gear housings and electric motor constituting an electric drive unit may be assembled separately and then easily be introduced into the housing configuration for assembly through said axial and radial locking and be removed from the housing configuration during disassembly.

According to an embodiment of the electric drive device the respective gear housing is locked axially as well as circumferentially to said housing configuration. Hereby a stable locking is obtained.

According to an embodiment of the electric drive device the respective gear housing is attached to the housing configuration by means of circumferentially distributed fastening elements. Hereby a stable attachment and locking axially as well as circumferentially is obtained.

According to an embodiment of the electric drive device the respective gear housing is attached to said housing configuration by means of a geometric locking. Hereby no fastening elements are required such as screw joints or the corresponding. The geometrical locking is according to a variant obtained by means of a splines configuration.

According to an embodiment of the electric drive device said housing configuration has an essentially ring-shaped cross section. Hereby introduction into and removal out of the housing configuration of electric drive unit, i.e. electric motor and gear housings with transmission, is facilitated. Further, good load absorption of the housing configuration is obtained and avoidance of load transmission to the electric motor is facilitated.

According to an embodiment of the electric drive device a radially in the housing configuration running fastening plane is disposed for the respective gear housing. By attaching the housing configuration with the respective gear housing to said running fastening plane, minimization of transmission of external loads to the electric motor is facilitated.

According to an embodiment of the electric drive device the housing configuration is arranged to be attached in connection to said fastening plane. By attaching the housing configuration with the respective gear housing to said running fastening plane transmission of outer loads to the electric motor is minimized.

According to an embodiment of the electric drive device the drive device is intended to be attached to said fastening plane at a frame construction of a vehicle intended to be impelled by means of the drive device. Hereby transmission of outer load to electric motor is minimized such that essentially all load is absorbed by the housing configuration such that the housing configuration due to external loads is bent such that its centre axle between said fastening planes is below the centre axle at the fastening planes, and its centre axle at its border area outside said fastening plane is above the centre axle at the fastening planes such that essentially no difference of height occurs at the fastening planes.

According to an embodiment of the electric drive device the drive device comprises a drive shaft element connected to said housing configuration and wherein bending stresses in the drive shaft element are transmittable to said housing configuration. Hereby the housing configuration is bent when subjected to load.

According to an embodiment of the electric drive device said drive shaft element is arranged to run essentially transverse to the longitudinal direction of a vehicle intended to be impelled by means of the drive device. Hereby efficient drive of the vehicle is obtained.

According to an embodiment of the electric drive device said drive shaft element is arranged essentially coaxially to said electric motor. Hereby efficient drive of the vehicle is obtained.

According to an embodiment of the electric drive device said fastening elements are arranged to run radially in the housing configuration and gear housings. Hereby efficient axial and radial locking is obtained.

According to an embodiment of the electric drive device said fastening elements are intended to be introduced in essentially radially running openings of the housing configuration and gear housings, wherein each opening of the housing configuration is wider than the respective corresponding opening of said gear housings. hereby attachment is facilitated also when axial fitting of the housing configuration and drive unit, i.e. electric motor and gear housings with transmission deviates somewhat such that the tolerance level may be relatively rough, which reduces costs.

According to an embodiment of the electric drive device said fastening element comprises screw joints. Hereby simple and efficient axial and radial locking is obtained.

According to an embodiment of the electric drive device the housing configuration, at the area of fastening of the housing configuration and gear housings, has an internally concave bulge or the gear housing has en externally concave bulge. Thereby efficient maintenance of sealing between housing configuration and gear housings is facilitated when the housing configuration is bent relative to the housings.

According to an embodiment of the electric drive device the stator is attached to said gear housings. Hereby is facilitated to reduce included details. No extra housing for the electric motor is required.

BRIEF DESCRIPTION OF THE DRAWINGS

A better understanding of the present invention will be had upon the reference to the following detailed description when read in conjunction with the accompanying drawings, wherein like reference characters refer to like parts throughout the several views, and in which:

FIG. 2a schematically illustrates a front view of an electric drive unit comprising an electric motor and gear housings according to an embodiment of the present invention;

FIG. 2b schematically illustrates a side view of the electric drive unit in FIG. 2a;

FIG. 3 schematically illustrates a housing configuration according to an embodiment of the present invention;

FIG. 5a schematically illustrates an axial cross sectional view of a detail of the electric drive device in FIG. 4a;

FIG. 6a schematically illustrates a radial cross sectional view A-A of the electric drive device in FIG. 4a;

FIG. 7b schematically illustrates a plan view of a detail of the detail in FIG. 7a;

DETAILED DESCRIPTION

Figure 1:
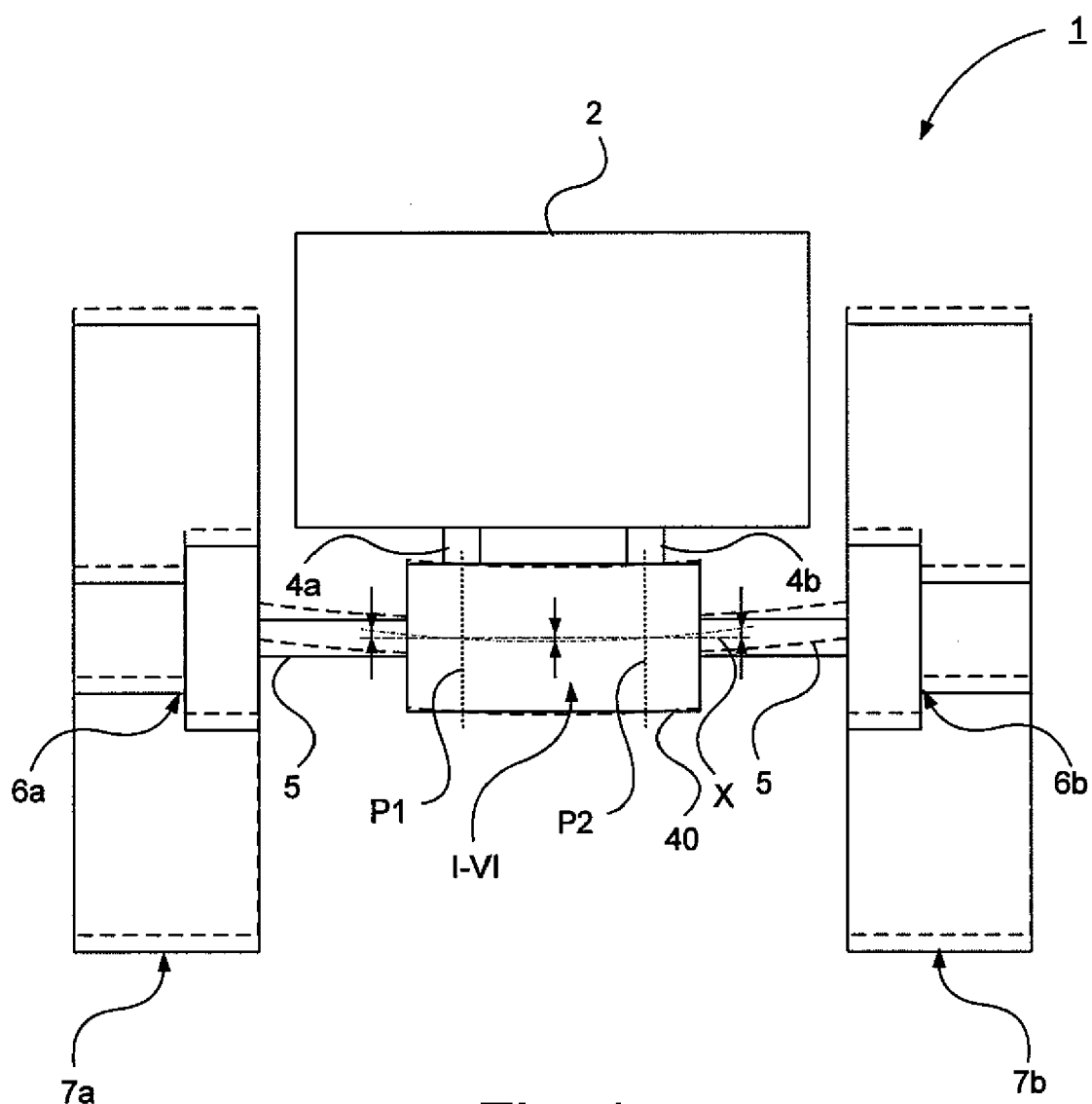
FIG. 1 schematically illustrates a motor vehicle according to an embodiment of the present invention.

FIG. 1 schematically illustrates a vehicle 1 according to an embodiment of the present invention. The exemplified vehicle 1 is constituted by a heavy vehicle in the form of a working vehicle such as a mining vehicle. The vehicle may alternatively be a military vehicle. The vehicle is according to a variant constituted by any suitable vehicle where conventional shafts are used. The motor vehicle 1 comprises an electric drive device 10 according to the present invention. The motor vehicle 1 is intended to be impelled by means of the drive device I. The motor vehicle 1 comprises a vehicle body 2 comprising a vehicle frame.

Figure 4A:
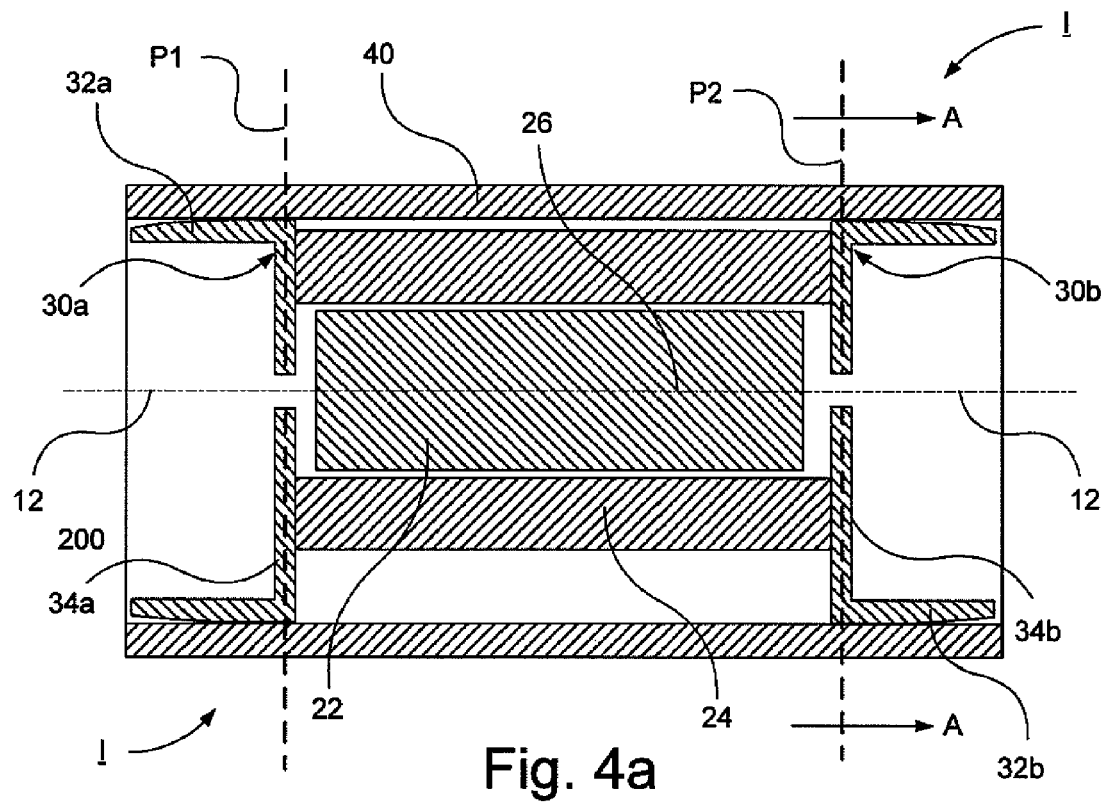
FIG. 4a schematically illustrates an axial cross sectional view of an electric drive device according to an embodiment of the present invention.
Figure 4B:
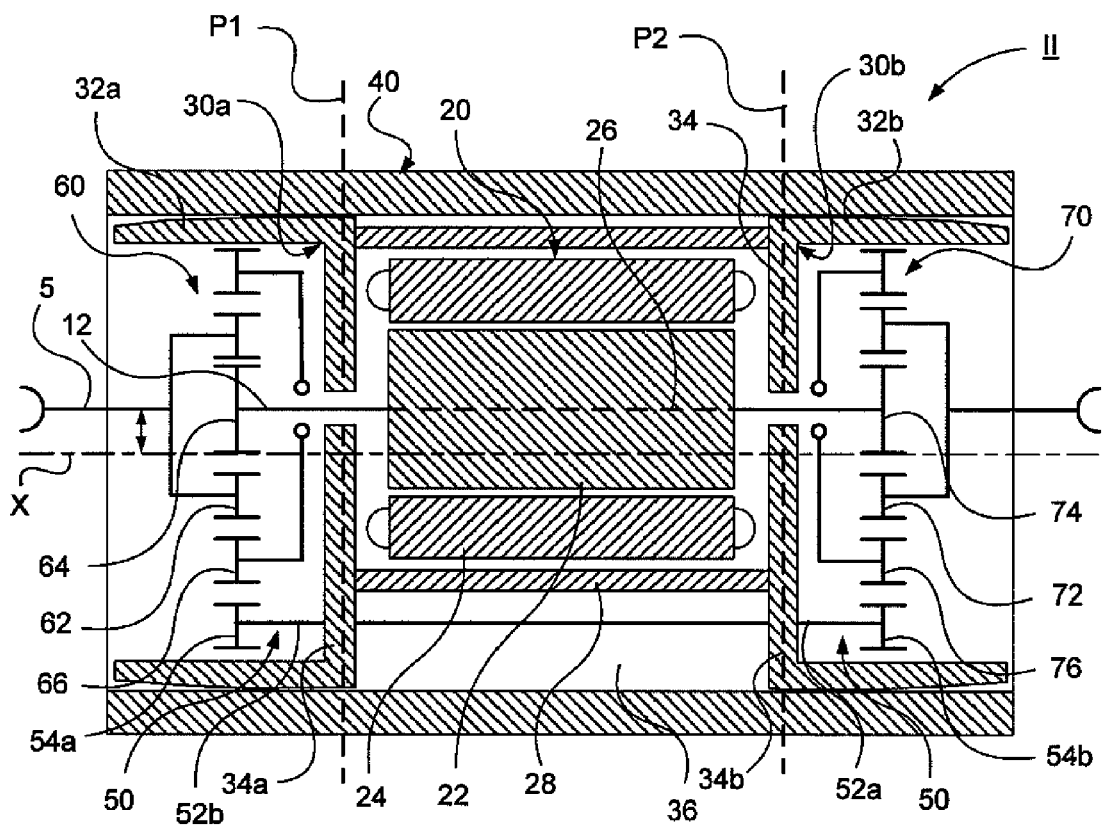
FIG. 4b schematically illustrates an axial cross sectional view of an electric drive device according to an embodiment of the present invention.

The electric drive device comprises an electric drive device 10 shown in FIG. 2a comprising an electric motor 20 and gear housings 30a, 30b arranged on each side of the electric motor 20, which accommodate a transmission configuration respectively of which a variant is shown in FIG. 4b. The electric drive device comprises a housing configuration 40 arranged to house said electric drive device 10. Gear housings 30a, 30b, electric motor 20 and transmission configuration are shown i.a. in FIG. 4b. The drive device, i.e. electric motor 20 and gear housings with transmission configuration is transversely arranged to the direction of travel of the vehicle 1 such that cardan shaft is not required.

The electric drive device is via the housing configuration 40 attached to radially running fastening planes P1, P2 of the gear housings at a frame construction of the motor vehicle. Said fastening planes P1, P2 are shown in more detail in FIGS. 4a-b and 5a-b. Said fastening between frame structure and drive device is according to a variant provided via fastening members 4a, 4b, so called damping pads, which may constitute integrated portions of the housing configuration 40, alternatively separate parts.

By means of the fastening of the electric drive device to said fastening plane P1, P2 at the frame construction of the vehicle body 2 transmission of external load to electric motor 20 is minimized such that essentially all load is absorbed by the housing configuration 40 such that the housing configuration 40 due to external loads is bent such that its centre axle X between said fastening planes P1, P2 is below the centre axle X at the fastening planes P1, P2, and its centre axle at its border area outside said fastening plane P1, P2 is above the centre axle at the fastening planes P1, P2 such that essentially no difference in height occurs at the fastening planes P1, P2.

Consequently no bending of the housing configuration 40 occurs at said fastening planes P1, P2, at the centre axle and also at the connection point of said fastening members 4a, 4b at the housing configuration 40. Hereby bending of the electric motor 20 is essentially avoided such that stator and rotor of the electric motor 20 do not come into contact with each other such that the electric motor 20 is destroyed.

The electric drive device comprises a drive shaft element 5 connected to the housing configuration 40 and wherein bending stresses in the drive shaft element 5 are transmittable to said housing configuration 40. Hub members 6a, 6b are arranged at the respective end of the drive shaft element 5. The hub members are according to an alternative variant constituted by drive wheels for tracked vehicles, which according to a variant comprises hub reduction gears. Ground engaging members 7a, 7b are arranged at the respective hub reduction 6a, 6b for propulsion of the vehicle 1. The ground engaging member 7a, 7b are according to a variant constituted by wheels. According to an alternative variant the ground engaging members 7a, 7b are constituted by tracks.

Said drive shaft element 5 is arranged to run essentially transverse to the longitudinal direction of the vehicle 1 intended to be impelled by means of the electric drive device. Said drive shaft element 5 is arranged essentially coaxial to said electric motor 20. Hereby efficient drive of the vehicle 1 is obtained.

The electric drive device is according to a variant intended to provide relatively high output torques and to have a relatively high output rotational speed. According to a variant the electric drive device comprising said hub reductions 6a, 6b is configured to provide output torque in the range of 200 kNm, for the electric drive unit apart from the hub reduction the corresponding torque is in the range of 10 kNm, according to this embodiment, and to have a maximum output rotational speed closer to 100 rpm, for the electric drive unit apart from the hub reduction the corresponding rotational speed is closer to 2000 rpm.

The housing configuration 40 is configured to be load carrying and constructed to handle heavy loads, according to a variant loads in the range of 100-400 tonnes. The housing configuration 40 is arranged to support external loads at said fastening. The housing configuration 40 is configured such that external loads, e.g. from the sides via e.g. hub reduction, are transmitted to the structure of the housing configuration 40 such that such loads do not affect the transmission configuration or electric motor 20. The housing configuration 40 is arranged to absorb driving torque from the electric motor 20. Such loads comprise loads arising during drive of the electric drive device, loads from above etc.

Said values mentioned above are only examples and any suitable electric drive device may be used depending on application. Consequently the present invention comprises an electric drive device having torque higher than 200 kNm, or substantially lower output torque than 200 kNm, and being designed for heavier loads than 100-400 tonnes, or lighter loads than 100-400 tonnes.

FIG. 2a schematically illustrates a front view of an electric drive unit comprising an electric motor 20 and gear housings according to an embodiment of the present invention and FIG. 2b a side view of the electric drive unit in FIG. 2a.

The electric drive unit 10 comprises as mentioned an electric motor 20. The electric motor 20 has according to this variant an essentially circular cylindrical shape with an essentially circular cross section.

The electric drive unit 10 comprises a first gear housing 30a arranged to accommodate a first transmission configuration, and a second gear housing 30b arranged to accommodate a second transmission configuration, wherein the electric motor 20 is arranged between said gear housings 30a, 30b. The electric drive unit comprises according to this variant a differential device 50.

The electric drive unit 10 is arranged to be received in a housing configuration shown in FIG. 3.

FIG. 3 schematically illustrates the housing configuration 40 according to an embodiment of the present invention. The housing configuration 40 is arranged to receive the electric drive unit 10 according to FIG. 2a-b.

The housing configuration 40 has an essentially ring shaped cross section with an imaginary centre axle X. According to the embodiment the housing configuration 40 has an essentially circular cross section. Hereby introduction into and removal out of the housing configuration 40 of the electric drive unit 10, i.e. the electric motor and gear housings with transmission configuration, is facilitated. Further a good load absorption of the housing configuration 40 is obtained and avoidance of load transmission to electric motor 20 is facilitated.

The housing configuration 40 comprises fastening member 4a for attaching the housing configuration 40 to the framework of a motor vehicle e.g. according to FIG. 1. The housing configuration has according to a variant additional fastening members 4c, 4d, 4e, 4f for adaption of different vehicles/frameworks. Further the housing configuration has an opening 8 for cables.

Figure 5A:
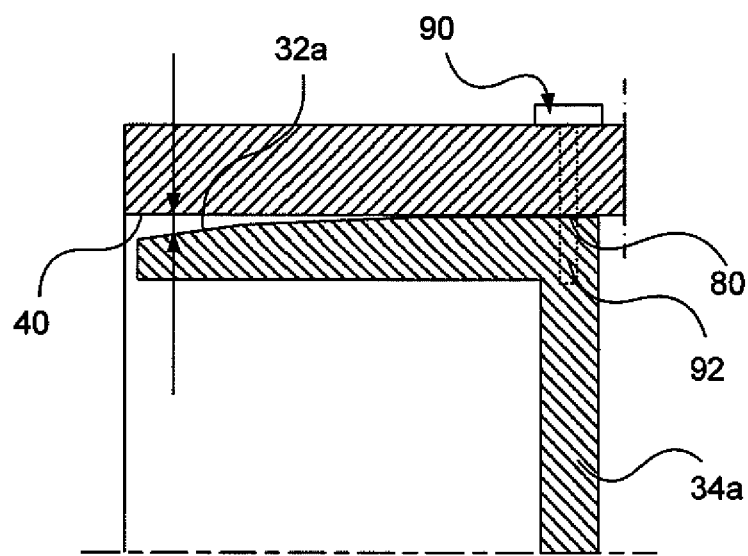
Figure 6A:
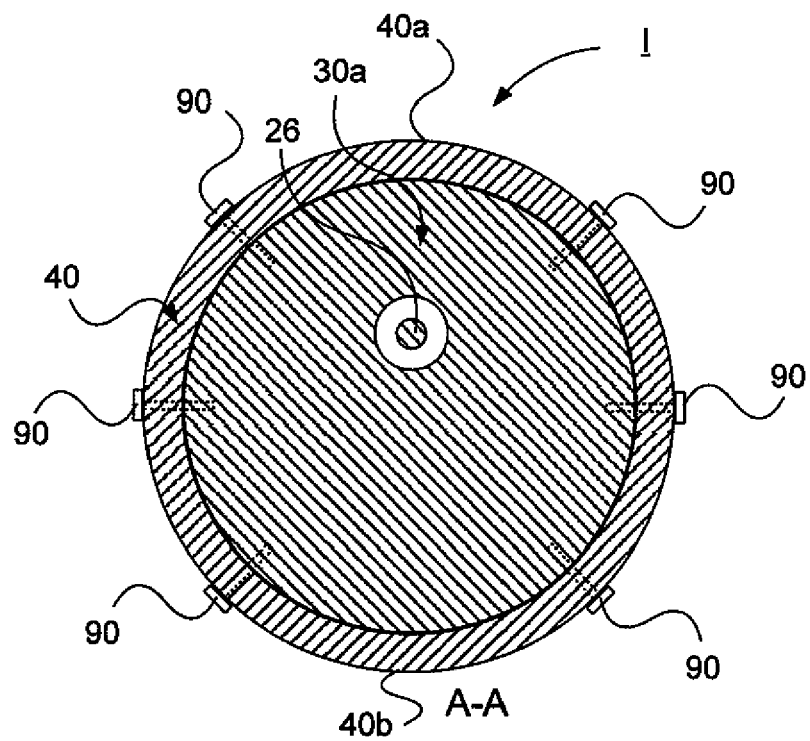

FIG. 4a schematically illustrates an axial cross sectional view of an electric drive device I according to the present invention, FIG. 4b an axial cross sectional view of an electric drive device II in more detail according to an embodiment of the present invention. FIG. 5a schematically illustrates an axial cross sectional view of a detail of the electric drive device I in FIG. 4a, and FIG. 6a schematically illustrates a radial cross sectional view A-A of the electric drive device I in FIG. 4a.

The electric drive device I; II comprises an electric drive unit comprising an electric motor 20 and gear housings 30a, 30b connected to the electric motor 20 and arranged at each side of the electric motor 20 respectively, each gear housing including a transmission configuration 60, 70, and a housing configuration 40 in which the electric drive device is accommodated.

The electric motor 20 as well as said opposite gear housings 30a, 30b are consequently arranged to be accommodated in the housing configuration 40. Each gear housing 30a, 30b is arranged to be removably attached and hereby axially as well as circumferentially locked to said housing configuration 40. By axially and circumferentially locking each gear housing 30a, 30b to said housing configuration 40, prolongation of life of the electric motor 20 is facilitated in that said locking facilitates that external loads essentially only affect the housing configuration 40 which is allowed to be bent while the electric motor 20 essentially is not affected, wherein essentially no loads are transferred to the electric motor 20 when it is arranged in a motor vehicle e.g. according to FIG. 1.

Further assembly and disassembly of the electric motor 20 are hereby facilitated in that said electric drive unit 10 comprising said gear housings 30a, 30b connected to each other separate from the housing configuration 40 and the electric motor 20 may easily be introduced into the housing configuration 40 for assembly by axially and circumferentially locking gear housing 30a, 30b and housing configuration 40. Further, the electric drive unit 10 may easily be removed from the housing configuration 40 during disassembly by disengaging said axial and radial locking between gear housings 30a, 30b and housing configuration.

The electric motor 20 comprises a rotor 22 and a stator 24, said rotor 22 being connected to a drive shaft 26 or rotor shaft 26 and being arranged to rotate said drive shaft 26. The drive shaft 26 is arranged to run concentrically relative to the stator 22, wherein the rotor 22 is arranged to surround the drive shaft 26. The stator 24 is arranged to surround the rotor 22, wherein the rotor shaft and consequently the rotor 22 are arranged concentrically relative to the stator 24. The drive shaft 26 consequently runs concentrically relative to the imaginary centre axle of the electric motor 20 such that a space 36 between the electric motor 20 and said housing is formed.

The stator is according to the embodiment illustrated in FIG. 4a fixedly arranged to said gear housings 30a, 30b, according to a variant by means of screw joint. According to the embodiment illustrated in FIG. 4b the electric drive unit 10 comprises an electric motor housing 28 arranged to surround the electric motor 20, wherein the stator 24 is fixedly connected to the electric motor housing 28, according to a variant by means of screw joint. According to a variant said gear housings 30a, 30b and the electric motor housing 28 constitute an integrated part.

The housing configuration 40 has an essentially ring-shaped cross section with an imaginary centre axle X. According to this embodiment the housing configuration 40 has an essentially circular cross section. The electric motor 20 is according to this embodiment arranged eccentrically displaced in the housing configuration 40 in such a way that the drive shaft 26 of the electric motor 20 runs parallel to and at a distance from the centre axle X of the housing configuration 40 for forming of said space 36. The space 36 is utilized for placing of a differential device 50 with a differential shaft configuration 52a, 52b and differential gears 54a, 54b and oil sump, and facilitates in a smooth way removing of the set of cables from the centre of the housing configuration 40.

As described above the housing configuration 40 constitutes a supporting structure in the electric drive device. The electric motor 20 is arranged at a distance from the internal surface of the housing configuration such that a play is formed between the external surface of the electric motor 20/stator and the internal surface of the housing configuration 40, the distance between the housing configuration and electric motor according to this embodiment, due to the eccentric placement, being shorter in the upper area of the electric drive device.

The electric drive device comprises an output shaft 12 connected to the drive shaft 26. The output shaft 12 is according to this embodiment aligned with the drive shaft 26. The output shaft 12 according to this embodiment extends through said drive shaft 26.

The electric drive device comprises opposite gear housings 30a, 30b, surrounding the electric motor 20, each including a transmission configuration. The electric drive device consequently comprises a first gear housing 30a arranged to receive a first transmission configuration 60, and a second gear housing 30b arranged to receive a second transmission configuration 70, wherein the electric motor 20 is arranged between said transmission configurations 60, 70.

The first and second gear housings 30a, 30b each have a sleeve-like shape. The respective gear housing 30a, 30b has a U-shaped axial cross section and a ring-shaped, here circular, radial cross section. The respective gear housing 30a, 30b has a portion 32a, 32b axially running along the internal surface of the housing configuration, and a portion 34a, 34b radially running essentially perpendicular to the axial direction of propagation of the housing configuration 40. The axially running portion 32a, 32b of the respective gear housing forms together with each radially running portion 34a, 34b a space/housing arranged to accommodate the respective transmission configuration 60, 70.

The radially running portion 34a, 34b of the respective gear housing 30a, 30b is arranged such relative to the electric motor 20 that the surface of the radially running portion 34a, 34b opposite from the side from which said axially running portion 32a, 32 of the respective gear housing 30a, 30b projects faces the electric motor 20. Consequently said axially running portion 32a, 32b of the respective gear housing 30a, 30b is arranged to project away from the electric motor 20. The stator 24 of the electric motor 20 is as described above according to the variant illustrated in FIG. 4a fixedly connected to the respective gear housing 30a, 30b. Alternatively the stator 24 is connected to the electric motor housing 28.

The axially running portion 32a, 32b of the respective gear housing 30a, 30b is, in the area for the passage to the axial portion 32a, 32b, arranged to essentially bear against an internal portion of the housing configuration 40. The axially running portion 32a, 32b of respective gear housing 30a, 30b is arranged to, at a distance from the area of the passage to the axial portion 32a, 32b, run at a distance from the internal surface of the housing configuration 40. According to a variant shown here, the distance between the external surface of the axial portion 32a, 32b and the internal surface of the housing configuration 40 with the axial distance from said area for passage from the radial portion 34a, 34b to the axial portion 32a, 32b. This is shown in more detail in FIG. 5b.

Said radially running portions 34a, 34b of the respective gear housing 30a, 30b are arranged to constitute partitions between the transmission configurations 60, 70 and the electric motor 20. These radial portion 34a, 34b are utilized for bearing support of rotor shaft and ring gear among others. Consequently each radial portion 34a, 34b has an opening for allowing the drive shaft 26 of the electric drive device there through.

The first transmission configuration is according to this embodiment constituted by a first planetary gear configuration 60 and the second transmission configuration is constituted by a second planetary gear configuration 70, the electric motor 20 being arranged between said first and second planetary gear configuration 60, 70.

The first planetary gear configuration 60 comprises planet gears 62, a sun gear 64, and a ring gear 66. The second planetary gear configuration 70 comprises planet gears 72, a sun gear 74, and a ring gear 76.

The first and second planetary gear configuration 60, 70 are drivably connected to each other via said output shaft 12. The output shaft 12 is connected to the sun gear 64, 74 of the respective planetary gear configuration 60, 70.

The differential device 50 is engaged to the ring wheel 66 of the first planetary gear configuration 60 and the ring gear 76 of the second planetary gear configuration 70 for providing of differential function.

By using a cylindrical housing 40 with a circular cross section a rigid housing 40 being easy and cheap to manufacture is obtained. According to an embodiment the construction element for the housing configuration 40 is constituted by a tube with a circular cross section which is optimal for load absorption.

As the output shaft 12 extends through said drive shaft 26 a motor-in-shaft solution is obtained with output shaft 12 via planetary gear configuration 60, 70 on the respective side of the electric motor 20. A motor-in-shaft solution does not require any cardan shafts, all power transfer is effected via cable. Specifically for the design according to this embodiment with electric motor 20 eccentrically arranged in the housing configuration 40 with a circular cross section a compact and volume efficient device is obtained, at the same time as the housing configuration 40 maintains a circular cylindrical shape for best structural strength and rigidity.

The electric drive device according to the present invention is intended firstly for medium sized and heavy special vehicles. Hereby the electric motor 20 is eccentrically placed relative to the circular cylindrical housing configuration 40, wherein at the same time coaxiality is maintained between drive shaft 26 and output shaft 12 and consequently drive shaft element 5 and drive wheel 6a, 6b.

At the area for said fastening plane P1, P2 the external peripheral surface of the respective gear housing 30a, 30b arranged to bear against the internal surface of the housing configuration. The electric drive device hereby comprises sealing means 80 for providing sealing between these surfaces for avoiding leakage. The sealing is consequently arranged to occur in the area for fastening, i.e. at said fastening plane P1, P2, where essentially no play is present between the internal surface of the housing configuration 40 and the external peripheral surface of the respective gear housing 30a, 30b and where the housing configuration 40 and gear housings 30a, 30b are arranged to be fastened together axially as well as circumferentially.

Said sealing means 80 comprises according to an embodiment a machining in the area for said fastening plane P1, P2 on the internal surface of the housing configuration 40 and correspondingly a machining on the opposite external surface, which results in good sealing.

According to an embodiment said sealing means 80 comprises sealing members. According to an embodiment said sealing members is constituted by a O-ring, not shown, which O-ring is arranged about the circumference of the housing configuration 40 in connection to the fastening element 90.

By arranging sealing means 80 between the internal surface of the housing configuration and the external surface of the respective gear housing 30a, 30b at said fastening planes P1, P2, good sealing is obtained.

Figure 5B:
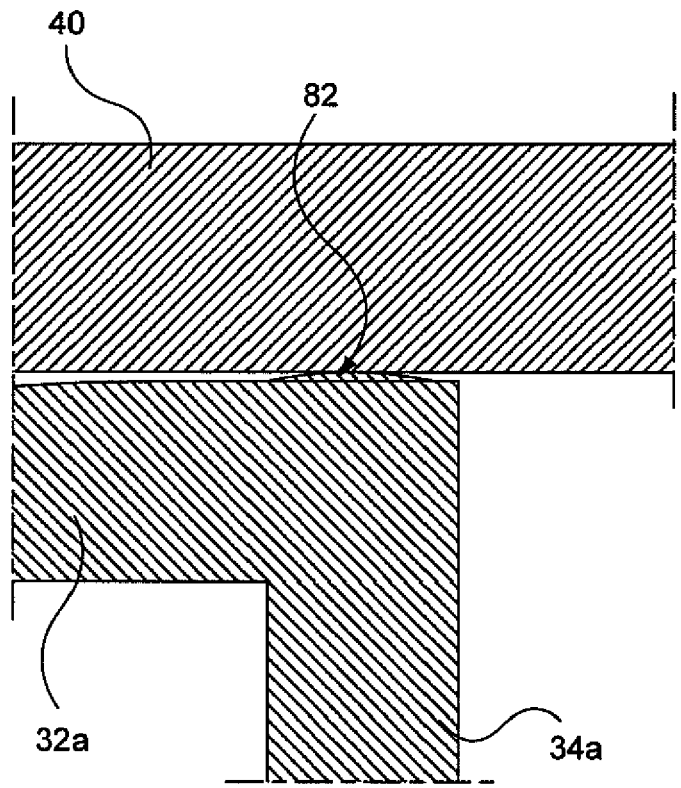
FIG. 5b schematically illustrates an axial cross sectional view of a detail of an electric drive device according to an embodiment of the present invention.

FIG. 5b schematically illustrates an axial cross sectional view of a detail of an electric drive device according to an embodiment of the present invention. According to this embodiment said sealing means comprises a concave bulge 82 arranged on the respective gear housing 30a, 30b at the area for fastening of the housing configuration 40 and gear housing 30a, 30b.

During load of the electric drive device such that bending of the housing configuration 40 occurs, no bending will occur at said fastening plane P1, P2 and also no displacement in height. During load a certain angling of the housing configuration 40 occurs though also in connection to said fastening planes P1, P2 which results in that for plane surfaces between housing configuration 40 and gear housing 30a, 30b at the area for fastening, a certain angle will occur between the somewhat bent housing configuration 40 and the respective gear housing 30a, 30b.

By arranging a concave bulge 82 along the external surface of the respective gear housing 30a, 30b in the area for fastening, i.e. in connection to said fastening plane P1, P2, as shown in FIG. 5b, the sealing between the housing configuration 40 and gear housing 30a, 30b is maintained independently of bending of the housing configuration 30, i.e. independently of angle between the housing configuration 40 and gear housings 30a, 30b at said fastening area. When the internal surface of the housing configuration 30 is angled relative to the external surface of respective gear housing 30a, 30b the surface of the housing configuration 40 will, thanks to the concave bulge 82, when the angle changes relative to the respective gear housing 30a, 30b, follow said concave surface.

Said concave bulge 82 is dimensioned and configured such that sealing between the surface of the concave bulge 82 is maintained independently of load, i.e. bending of the housing configuration 40. Said concave bulge 82 has according to a variant a substantially spherical shape.

According to an alternative variant the respective gear housing 30a, 30b has a concave bulge at the internal surface of the housing configuration 40 at the area for fastening of the housing configuration 40 and gear housings 30a, 30b.

The respective gear housing 30a, 30b of the electric drive device is attached to said housing configuration 40 by means of fastening elements 90 distributed circumferentially. Said fastening element is as evident from i.a. FIG. 6a arranged to run radially in the housing configuration 40 and gear housing 30, 30b wherein an efficient axial and radial locking is obtained. According to this embodiment of the electric drive device said fastening element comprises screw joints in the shapes of screws with a screw portion 92 arranged to be introduced through the housing configuration 40 and fixedly threaded in en opening of the gear housing. Hereby a simple and efficient axial and radial locking is obtained.

According to this embodiment said fastening element comprises six screw joints 90 at the respective fastening plane P1, P2. According to this embodiment the screw joints 90 are distributed along the side of the respective fastening plane P1, P2, wherein the upper portion and lower portion of said fastening planes, i.e. the upper area in connection to said fastening plane P1, P2 and lower area in connection to said fastening plane P1, P2 do not have any screw joint. Since the bending will be greatest in the upper portion 40a and lower portion 40b of the housing configuration 40, where a compression occurs in the upper portion of the housing configuration 40 and a stretching in the lower portion of the housing configuration 40, less influence due to the fastening element during bending will occur by avoiding having fastening element arranged there.

Dimension and configuration of the fastening element and number of fastening elements depend among others on power of electric motor and expected load on the electric drive device.

Figure 6B:
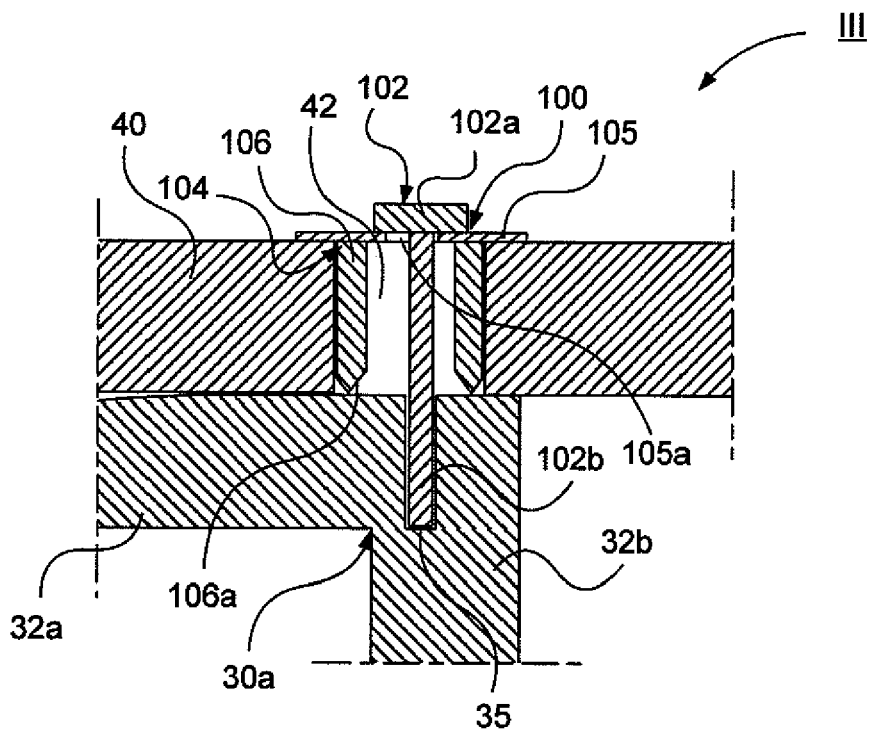
FIG. 6b schematically illustrates an axial cross sectional view of a detail of an electric drive device according to an embodiment of the present invention.

FIG. 6b schematically illustrates an axial cross sectional view of a detail of an electric drive device III according to an embodiment of the present invention with a fastening element 100 according to an embodiment. According to this embodiment the housing configuration 40 comprises radially running openings 42 in connection to the area for said fastening plane P1, P2. Further the respective gear housing 30a, 30b comprises radially running blind openings 35 arranged in connection to the area for said fastening planes P1, P2. Said openings 42 radially running through the housing configuration 40 are wider than corresponding radially running openings 35 of the respective gear housing 30a, 30b. Said openings 42 radially running through the housing configuration 40 are according to a variant constituted by circular holes. Said radially running openings 35 of the respective gear housing 30a, 30b are according to a variant constituted by circular holes, preferably threaded holes.

As the respective opening 42 of the housing configuration 40 is wider, i.e. has a greater diameter, than the respective corresponding opening 35 of said gear housing 30a, 30b, fastening is facilitated also when axial fitting of the housing configuration 40 and drive unit, i.e. electric motor 20 and gear housings 30a, 30b with transmission, mismatch somewhat such that the tolerance level of the housing configuration 40 and drive unit 10 is taken into account, which results in the tolerance level with respect to axial length of the housing configuration 40 and electric motor 20 and gear housings 30a, 30b may be relatively rough, which reduces costs.

The respective fastening element 100 according to this embodiment comprises a clamping sleeve configuration 100. Said clamping sleeve configuration 100 comprises a screw joint 102 with at screw cap 102a and a screw portion 102b running perpendicular to the screw cap 102, which screw portion 102b is arranged to be introduced through the radial opening 42 of the housing configuration 40 and further through the radial opening 35 of the gear housing fitted to the housing configuration 40. Preferably the screw portion 102b has a threading corresponding to a threading of the radial opening 35 of the respective gear housing 30a, 30b.

Said clamping sleeve configuration 100 comprises a tray element 105 with a central opening 105a for passing through of said screw portion 102b. The opening 105a is smaller than said screw cap 102a such that during passing through of the screw portion 102a, the cap 102b is stopped by said tray element 105. The cross section 105a of the opening is further larger than the cross section of said screw portion such that by fastening, the screw element 102 is allowed to run axially in the area for fastening in connection to said fastening planes P1, P2.

Said clamping sleeve configuration further comprises a sleeve element 104. Said sleeve element 104 comprises ring-shaped portion 106 projecting substantially perpendicular from the periphery of the tray element 105. The projecting ring-shaped portion has a point-shaped end 106a. The point-shaped end 106a has an angled profile where the point according to a variant is somewhat displaced from the centre of the ring-shaped running edge.

Said sleeve element 104 of the respective clamping sleeve configuration 100 is dimensioned to fit in said respective radially running opening 42 of the housing configuration 40. According to a variant the external surface of said ring-shaped portion 106 is arranged to adjoin and essentially follow the radially running opening 42 of the housing configuration 40.

Said sleeve element 104 of the respective clamping sleeve configuration 100 is further dimensioned such that the pointy edge 106a of said ring-shaped portion 106 bears against the external surface of the gear housing and runs about and at a distance from said radially running opening 35 of the gear housing.

During fastening of the respective clamping sleeve configuration 100 the sleeve element 104 is introduced into the radially running opening 42 of the housing configuration 40, wherein screw element 102 is introduced into the opening of the tray element 105 and further being axially fitted such that it may be introduced/threaded in the radially running opening 35 of the gear housing.

The point-shaped end 106a of the ring-shaped portion 106 of the sleeve element 104 is configured such that the pointy edge during tightening of the screw element 102 cuts somewhat into the external surface of the gear housing wherein the housing configuration 40 is locked relative to the gear housing.

Figure 7A:
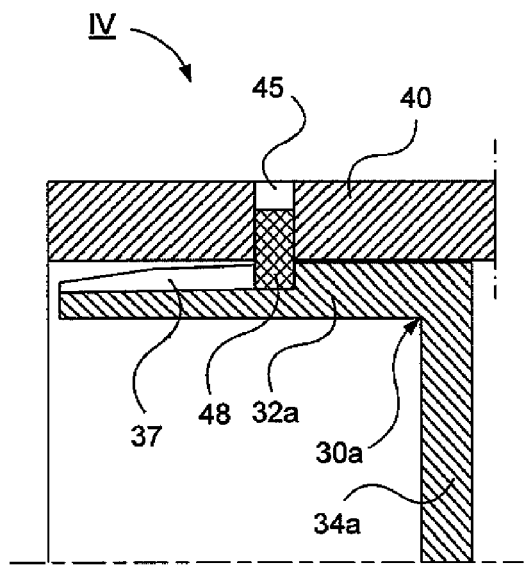
FIG. 7a schematically illustrates an axial cross sectional view of a detail of an electric drive device according to an embodiment of the present invention.
Figure 7B:
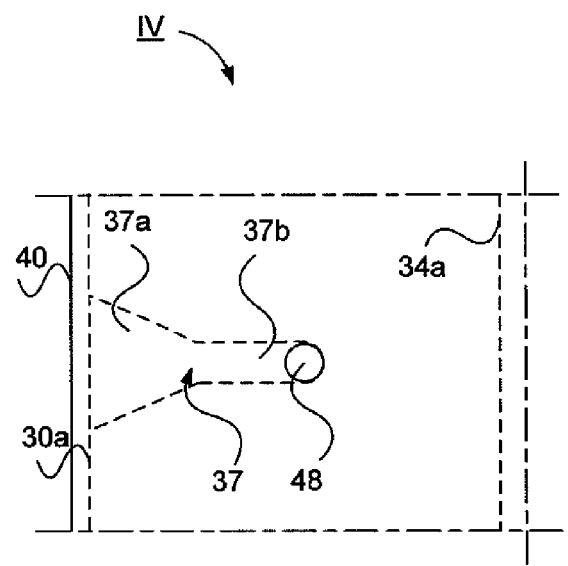

FIG. 7a schematically illustrates an axial cross sectional view of a detail of an electric drive device IV according to an embodiment of the present invention and FIG. 7b a plan view of the detail in FIG. 7a.

According to an embodiment shown in FIGS. 7a and 7b the electric drive device comprises a guide configuration for facilitating assembly and disassembly of the drive unit in the housing configuration 40. Said guide configuration comprises a groove 45 radially running in the housing configuration 40 arranged at least in the area of one end, according to a variant in the area of the respective end, of the housing configuration 40. At least one of the gear housings, according to a variant each gear housing 40a, 40b further comprises an externally arranged axially running guide grove 37. The guide groove 37 has a wider portion 37a at the side end of the gear housing which tampers and transfers into a smaller portion 37b which essentially correspond to the width/diameter of the wedge element/groove screw.

The guide configuration further comprises a wedge element 48 in the shape of a groove screw. The wedge element/groove screw has a width/diameter essentially corresponding to the smaller portion 37b of the guide groove 37.

The wedge element is intended to be introduced, according to a variant screwed, into the radial through groove 45 such that it projects out internally of the housing configuration 40 a distance essentially corresponding to the depth of the guide groove 37. During introduction of the electric drive unit 10 with an electric motor 20 and gear housings 30a, 30b the wedge element 38 projecting out internally of the housing configuration 40 will be guided in the wider portion 37a of the guide groove towards the end of the guide groove 37 wherein the electric drive unit 10 will be guided correctly such that said rive unit is correctly turned relative to the housing configuration 40 such that fastening by means of fastening elements in radial opening of gear housings 30a, 30b and housing configuration is facilitated. In the variant with a radial grooves 45 at the respective end area of the housing configuration 40 and guide grooves in the end are of the respective gear housing 30a, 30b wedge element/groove screw 48 are introduced/screwed into the second radial groove 45. During disassembly one of the wedge elements/groove screws 48 is removed.

By having separate wedge elements/groove screws 48 it is facilitated, when the electric drive unit 10 is arrange din the housing configuration, to remove the wedge elements such that the electric drive unit 10, when assembled, is fixedly held by means circumferentially distributed radially running fastening elements arranged in the area for fastening in connection to said fastening planes P1, P2.

Above an electric drive device where the electric motor 20 is arranged eccentrically displaced in the housing configuration 40 in such a way that the drive shaft of the electric motor 20 runs parallel to and at a distance from the centre axle of the housing configuration 40. According to an alternative variant the electric motor 20 is concentrically arranged in the housing configuration 40 in such a way that the drive shaft of the electric motor 20 runs aligned with the centre axle of the housing configuration 40.

Above, in connection to FIG. 4b, an example of a transmission configuration of the respective gear housing has been described. Any suitable transmission may be used here.

Above embodiments have been described where the respective gear housing is attached and hereby axially as well as circumferentially locked to said housing configuration 40 by means of circumferentially distributed fastening elements.

According to an alternative variant locking of the respective gear housing at the housing configuration is provided by means of geometric locking. The geometric locking is arranged at least in the area for fastening in connection to said fastening planes P1, P2.

Figure 8A:
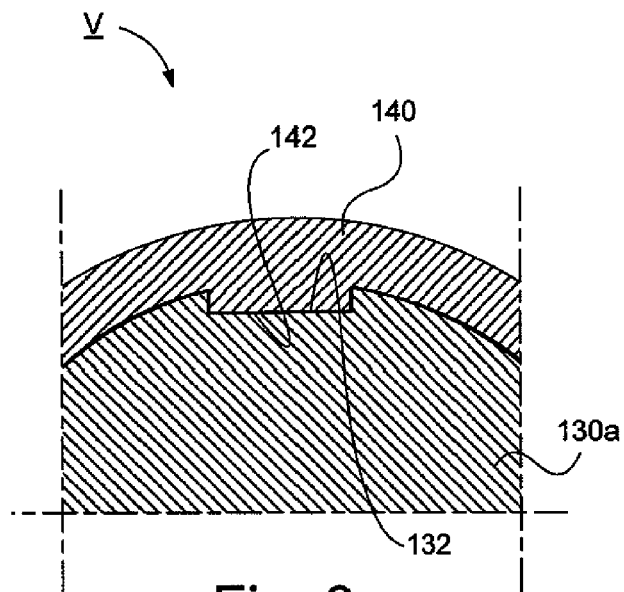
FIG. 8a schematically illustrates a radial cross sectional view of a detail of an electric drive device according to an embodiment of the present invention.

FIG. 8 schematically illustrates a radial cross sectional view of a detail of an electric drive device V according to an embodiment of the present invention, wherein the respective gear housing, of which one gear housing 130a is shown, is attached to the housing configuration 140 by means of a geometric locking according to an embodiment of the present invention, the geometrical locking comprising a splines configuration, which splines configuration comprises splines 142 internally arranged in the housing configuration 140 and corresponding external splines 132 arranged on the respective gear housing 130a. Said splines configuration is arranged at least in the area for fastening in connection to said fastening plane P1, P2. According to a variant the splines configuration is supplemented with a not shown screw joint for axial locking. According to a variant the geometrical locking is a boom joint.

Figure 8B:
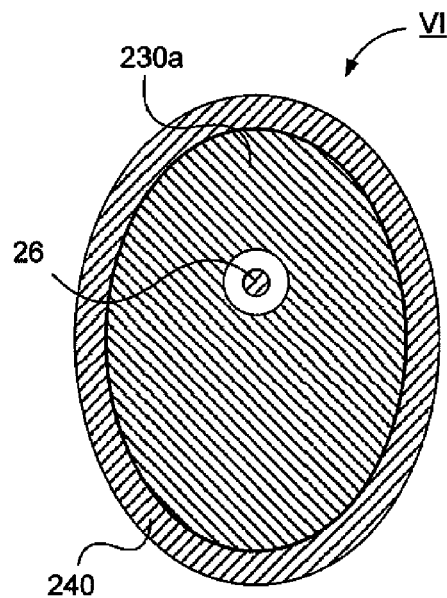
FIG. 8b schematically illustrates a radial cross sectional view of an electric drive device according to an embodiment of the present invention.

FIG. 8b schematically illustrates a radial cross sectional view of an electric drive device VI according to an embodiment of the present invention, the geometrical locking comprising an oval shape of the respective gear housing, of which one of the gear housings 230a is shown, i.e. an oval cross section, and an oval shape of the housing configuration 240. Hereby no radial locking is required.

According to an embodiment the electric drive unit is geometrically locked in the circumferential direction, while the electrical drive unit is allowed to float in axial direction in the housing configuration.

Above an electric drive device with a housing configuration for accommodating an electric drive unit comprising electric motor 20 and gear housing with transmission configuration, where the housing configuration 40 has an essentially circular cross section with an imaginary centre axle X has been described.

According to an alternative embodiment the electric drive device has a housing configuration with a substantially elliptic cross section for receiving and accommodating an electric drive unit according to the present invention as shown in FIG. 8b. According to an alternative embodiment the electric drive device has a housing configuration with an essentially egg-shaped cross section for receiving and accommodating an electric drive unit according to the present invention. According to an alternative embodiment the electric drive device has a housing configuration with an essentially elongated cross section with parallel sides and hemicircle-shaped ends for receiving and accommodating an electric drive unit according to the present invention.

Features in the above mentioned embodiments of the electric drive device may be combined, such as fastening elements and geometric locking.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

The invention claimed is:

1. An electric drive device comprising:
   an electric motor with a stator and a rotor arranged to rotate a drive shaft;
   gear housings disposed at opposite ends of the electric motor, each containing a transmission configuration; and
   a one-component housing,
   wherein the electric motor and the gear housings are accommodated inside the housing,
   each gear housing is permanently attached and thereby locked to said housing
   said drive shaft is a one-component drive shaft which directly connects the transmission configurations in the gear housings,
   each gear housing has a fastening plate that is oriented in a radial direction in the housing and that extends in the radial direction so as to cover a radial cross-section of the housing and to have an opening corresponding to the drive shaft, and
   the drive shaft is accommodated in the openings, and the openings radially align with the radial direction of the fastening plates,
   a differential device that comprises a shaft running outside the electric motor and is coupled with the transmission configurations at both ends of the shaft of the differential device.

2. The electric drive device according to claim 1, wherein the respective gear housing is locked axially as well as circumferentially to said housing.

3. The electric drive device according to claim 1, wherein the respective gear housing is attached to said housing by means of circumferentially distributed fastening elements.

4. The electric drive device according to claim 3, wherein said fastening elements are arranged to run radially in the housing and gear housings.

5. The electric drive device according to claim 3, wherein said fastening elements are configured to be introduced in essentially radially running openings of the housing and gear housing, wherein each opening of the housing is wider than the respective corresponding opening of said gear housing.

6. The electric drive device according to claim 3, wherein said fastening element comprises screw joints.

7. An electric drive device according to claim 1, wherein the respective gear housing is attached to said housing by means of a geometric locking.

8. The electric drive device according to claim 1, wherein said housing has an essentially ring-shaped cross section.

9. The electric drive device according to claim 1, wherein the housing is arranged to be attached in connection to said fastening plates.

10. The electric drive device according to claim 1, wherein the drive device is configured to be attached via fastening members at said fastening plates to a frame construction of a vehicle intended to be impelled by means of the drive device.

11. The electric drive device according to claim 1, wherein the drive device comprises a drive shaft element connected to said housing and wherein bending stresses in the drive shaft element are transmittable to said housing.

12. The electric drive device according to claim 11, wherein said drive shaft element is arranged to run essentially transverse to the longitudinal direction of a vehicle intended to be impelled by means of the drive device.

13. The electric drive device according to claim 11, wherein said drive shaft element is arranged essentially coaxially to said electric motor.

14. An electric drive device according to claim 1, wherein the housing, at the area of fastening of the housing and gear housings, has an internally concave bulge or the respective gear housing has an externally concave bulge.

15. The electric drive device according to claim 1, wherein the stator is attached to said gear housings.

16. A motor vehicle comprising the electric drive device according to claim 1.

17. The electric drive device according to claim 1, wherein one of the transmission configurations is placed at one end of the housing with respect to an axial direction of the drive shaft, and the other of the transmission configurations is placed at the other end of the housing with respect to the axial direction.

18. The electric drive device according to claim 1, wherein the transmission configuration is a planetary gear configuration.

* * * * *